US008117237B2

(12) United States Patent
Benhadda et al.

(10) Patent No.: US 8,117,237 B2
(45) Date of Patent: Feb. 14, 2012

(54) OPTIMIZED METHOD AND SYSTEM FOR MANAGING PROPER NAMES TO OPTIMIZE THE MANAGEMENT AND INTERROGATION OF DATABASES

(75) Inventors: Hamid Benhadda, Rueil-Malmaison (FR); Catherine Gouttas, Paris (FR)

(73) Assignee: Thales, Neuilly Sure Seine (FR)

( * ) Notice: Subject to any disclaimer, the term of this patent is extended or adjusted under 35 U.S.C. 154(b) by 204 days.

(21) Appl. No.: 12/643,043

(22) Filed: Dec. 21, 2009

(65) Prior Publication Data

US 2010/0217781 A1    Aug. 26, 2010

(30) Foreign Application Priority Data

Dec. 30, 2008    (FR) .................................. 08 07488

(51) Int. Cl.
*G06F 7/00* (2006.01)
*G06F 17/30* (2006.01)
(52) U.S. Cl. ........................ 707/802; 707/803
(58) Field of Classification Search .................. None
See application file for complete search history.

(56) References Cited

U.S. PATENT DOCUMENTS

| | | | |
|---|---|---|---|
| 2005/0149507 A1* | 7/2005 | Nye | 707/3 |
| 2005/0278175 A1* | 12/2005 | Hyvonen | 704/242 |
| 2006/0271526 A1* | 11/2006 | Charnock et al. | 707/3 |
| 2007/0005358 A1* | 1/2007 | Heidenreich et al. | 704/251 |
| 2007/0288451 A1* | 12/2007 | Meyer et al. | 707/5 |
| 2008/0077588 A1* | 3/2008 | Zhang et al. | 707/6 |
| 2008/0167858 A1* | 7/2008 | Christie et al. | 704/10 |

OTHER PUBLICATIONS

Verykios, et al, 2000. "Automating the approximate record-matching process." Information Sciences 126: 83-98.
Cohen, et al, 2001. "Learning to Match and Cluster Entity Names." ACM SIGIR-2001 Workshop on Mathematical/ Formal Methods in Information Retrieval. <<http://citeseerx.ist.psu.edu/viewdoc/summary?doi=10.1.1.21.3824>> Retrieval date: Jun. 24, 2009.
Koudas, et al, 2006. "Record Linkage: Similarity Measures and Algorithms." Proceedings of the 2006 ACM SIGMOD International Conference on Management of Data, pp. 802-803. <<http://portal.acm.org/citation.cfm?id=1142473.1142599>> Retrieval date: Jun. 24, 2009.
Cardie, et al, 1999. "Noun Phrase Coreference as Clustering." Proceedings of the Joint Conference on Empirical Methods in Natural Language Processing and Very Large Corpora, pp. 82-89. <<http://eprints.kfupm.edu.sa/53538/1/53538.pdf>> Retrieval date: Jun. 24, 2009.
Elfeky, et al, 2002. "TAILOR: A Record Linkage Toolbox." Proceedings of the 18th International Conference on Data Engineering, pp. 17-28.

(Continued)

*Primary Examiner* — Hung T Vy
*Assistant Examiner* — Tuan A Pham
(74) *Attorney, Agent, or Firm* — Stroock & Stroock & Lavan LLP

(57) ABSTRACT

Optimized method and system making it possible to manage named entities or proper names that are presented in a different graphical or syntactic form and contained in a database (3), characterized in that it comprises, in combination, the implementation of the Levenshtein method by using a measurement of similarity from the Levenshtein method and of the n-grams method in order to find a canonic entity that can replace a set of named entities in a database.

8 Claims, 4 Drawing Sheets

OTHER PUBLICATIONS

Ferres, et al, 2004. "Automatic Building of Gazetters of Co-referring Named Entities." Proceedings of the 4th International Conference on Language Resources and Evaluation. <<http://www.Isi.upc.edu/{nlp/papers/ferreseta104a.pdf>> Retrieval date: Jun. 24, 2009.

Ah-Pine, et al, 2005. "Un nouvel outil de classification non supervisee de documents pour la decouverte de connaissances et la detection de signaux faibles : rares text." <<http://isdm.univ-tln.fr/PDF/isdm22/isdm22_ahpine.pdf>> Retreival date: Jun. 24, 2009.

* cited by examiner

OPTIMIZED METHOD AND SYSTEM FOR MANAGING PROPER NAMES TO OPTIMIZE THE MANAGEMENT AND INTERROGATION OF DATABASES

CROSS REFERENCE TO RELATED APPLICATIONS

The present application claims priority to French Patent Application Serial No. 0807488, filed on Dec. 30, 2009, which is hereby incorporated by reference in its entirety.

TECHNICAL FIELD OF THE INVENTION

The subject of the present invention relates to an optimized method for managing proper names or named entities to optimize the management and interrogation of databases and knowledge bases. It relies notably on an automation of the method of matching graphical variants and syntactic variants of proper names or named entities that refer to a single name or entity.

The method leads to a modification of the content of the database allowing for a more rapid search in a base or to an optimized management of this same database.

It is thus used to improve and speed up the processes of feeding and managing databases or knowledge bases, and the information search processes.

BACKGROUND OF THE INVENTION

In the field of data or knowledge management, to feed the bases, the prior art uses information extraction tools applied to broad collections of texts that make it possible to identify named entities of different types: names of people, names of organizations, names of places, addresses, etc.

These entities are subject to a very great graphical and syntagmatic variability—because of typographic or spelling errors, because of transliteration and transcription problems, because also of the syntagmatic transformation process (reduction/extension), order of the words, creation of abbreviations, etc. While the process of extracting named entities is now fairly well mastered, the matching process is less so and the matching task is performed manually.

Thus, at the output of the named entity extraction process, there will be, for an entity of Person type, for example in the case of an individual named "Laurent Gbagbo", a very significant list of variants from the quantitative point of view, including {Laurent Gbabgo, Laurent Gbagbo, L. Gbabgo, L. Gbagbo, etc.}. These variants refer to the same person and must be closely matched to be stored in the knowledge base, in order to ensure knowledge consistency. In the same way, in the Person databases, the individuals are often stored over several records of a database because of errors committed on inputting their name, their address, etc. Then the expression "Laurent Gbago" could be considered as the canonic form entity for all the variants cited above.

The issue of matching the named entities or names Of persons is widely discussed in the literature. The proposed methods, according to the knowledge of the Applicant, are principally based on the abovementioned methods of calculating the Levenshtein distance, of phonemization or of calculating similarities separately (without combinations of these techniques).

The Levenshtein method when used alone remains almost unusable because it does not give convincing results. Phonemization produces good results for the matching of entities, but it remains dependent on the language and imposes the intervention of experts to develop and maintain the rules of the phonemization device or phonemizer. The calculations of similarity or distance produce good results, which nevertheless remain dependent on the manner in which the named entities are processed (bi-grams only, tri-grams only, etc.). One objective of the present patent application is to optimize the results obtained by combining the abovementioned methods.

SUMMARY OF THE INVENTION

The inventive method relies, notably, on a combined use of linguistic methods and mathematical methods, notably a measurement of similarity that relies on the Levenshtein distance which measures the similarity between two character streams, the n-grams method, corresponding to a subsequence of n elements constructed from a given sequence, relational analysis and regularized similarity. These different methods are known to those skilled in the art and only reviews necessary to an understanding of the invention will be given in the present patent application.

The invention relates to a method making it possible to manage named entities that are presented in different graphical or syntactic forms and refer to the same entity, contained in a database, characterized in that it comprises at least the following steps:

applying a Levenshtein method to said entities $E_i$ in the database in order to create a similarity between said entities, defining the measurement of similarity between two entities in the following manner $$S_l(E_i, E_j) = 1 - \frac{D(E_i, E_j)}{\max(|E_i|, |E_j|)}$$

with $S_l$ being the measurement of similarity between the two entities $(E_i, E_j)$ in the database, D being the Levenshtein distance between the two entities, $|E_i|$ respectively $|E_j|$ being the number of characters of $E_i$, respectively $E_j$, using the n-grams method to create a similarity $S_n (E_i, E_j)$ between the A entities constituting the database, by extracting from the two entities $E_i$ and $E_j$ the sets $N_i$ of the n-grams of $E_i$ and the set $N_j$ of the n-grams of $E_j$, then defining the number of n-grams $|N_i|$ deduced from $E_i$ and the number of n-grams $|N_j|$ deduced from $E_j$, the similarity between $E_i$ and $E_j$ is then defined by:

$$S_n(E_i, E_j) = \frac{|N_i \cap N_j|}{\min(|N_i|, |N_j|)}.$$

using a method of merging the data on said entities in the database in order to construct at least 2 classifications, respectively relating to the n-grams similarity with n greater than or equal to 2, said classifications corresponding to sets of entity classes $P_i$.

finding the consensus partition $P_c$ between the M partitions found, using the canonic form entity $E_c$ to view the result or else modify the entities present in the database through the canonic form entity.

The merging method implemented can be the relational analysis method.

In the relational analysis step, in order to accomplish the relational analysis step to find the consensus partition between the determined partitions, the method uses, for example, the regularized similarity to weight the weight of each partition differently, in the calculation of the overall similarity deduced from the three partitions by executing the following steps the first step is to calculate the density $\delta_i$ of each partition $P_j$,
this density is a measurement of the aggregation power of the partition concerned and is defined by the relationship:

$$\delta_i = \frac{\sum_{k=1}^{K} n_{ik}^2}{nb\_entities^2}$$

in which κ is the number of classes of the partition $P_j$, $n_{ik}$ the number of entities of the partition k and nb_entities is the number of entities present in the base, by denoting $$\Delta = \sum_{i=1}^{3} \delta_i,$$

then the weight $\Pi_i$ of the partition $P_i$ will be:

$$\Pi_i = 0.5 \times \left(1 - \frac{\delta_i}{\Delta}\right).$$

The method can include a step for the sending of a request from a user to find the canonic entities in a database and perform the replacement of said entities with the canonic entity found.

The invention also relates to a system making it possible to manage named entities that are presented in different graphical or syntactic forms and refer to the same entity, contained in a database in which the method will execute different physical actions at the database level to optimize the quality of the database and consequently obtain a better management thereof, characterized in that it comprises at least the following elements:
  a processor adapted to execute the various steps of the method according to the invention,
  an unstructured database, this base can contain texts,
  a buffer memory making it possible to store all the data for which the matching is required.

The system can also include a device for taking decisions following a request formulated by a user.

The system can also include a human-machine interface making it possible to display the classification results of the method presenting at least one of the abovementioned characteristics and the intervention of an operator to modify the initial database by replacing the entities present in the database with the canonic form entity.

BRIEF DESCRIPTION OF THE DRAWINGS

Other characteristics and advantages of the device according to the invention will become more apparent from reading the following description of an exemplary embodiment, given as an illustration that is by no means limiting, with appended figures that represent.

DETAILED DESCRIPTION OF THE PREFERRED EMBODIMENTS

In order to give a better understanding of the method according to the invention, the first example given is in relation to the management of a database containing a collection of unstructured data.

Figure 1:
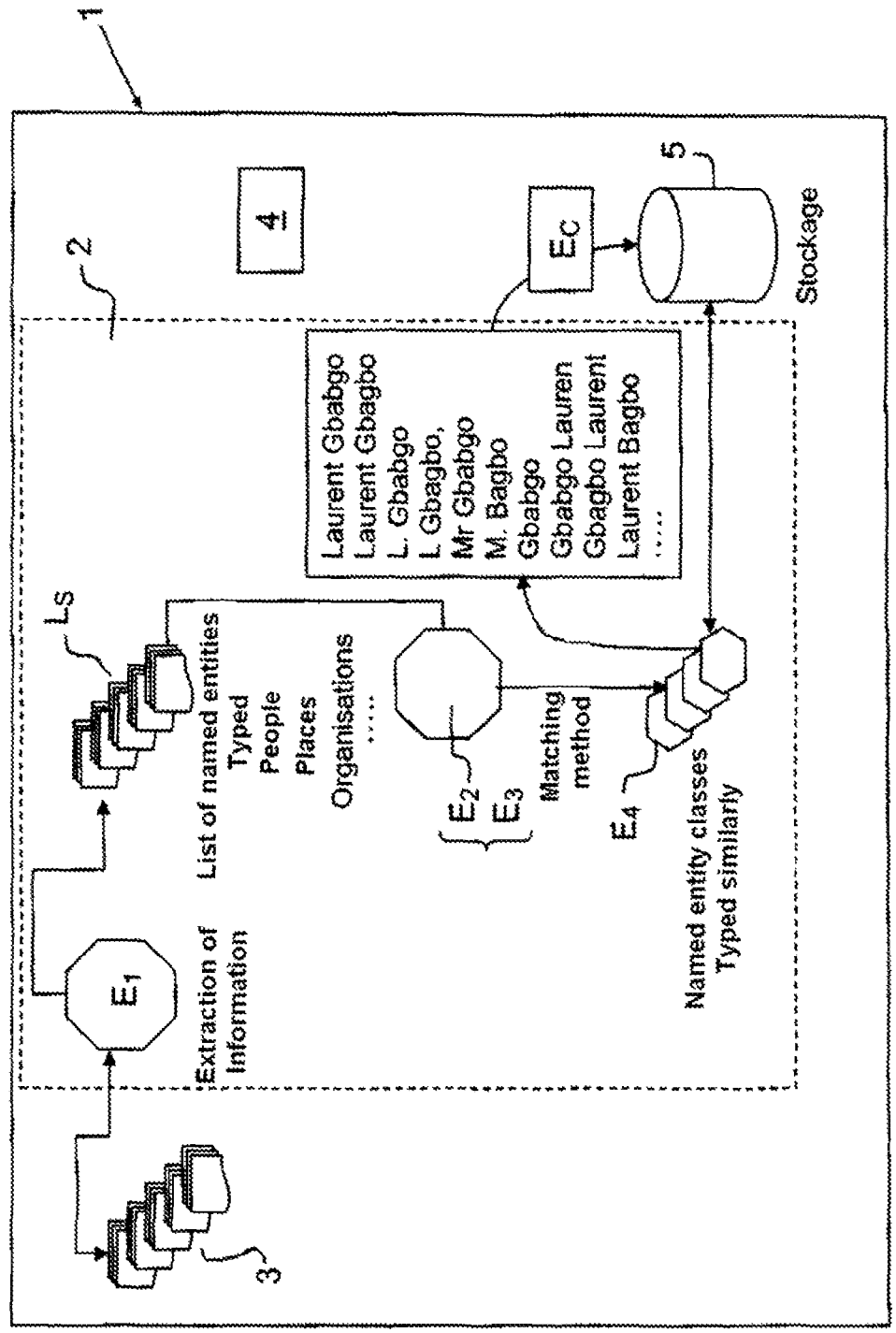
FIG. 1, an exemplary system making it possible to implement the method according to the invention,
  FIG. 2, a block diagram of the various steps implemented by the method according to the invention,
  FIG. 3, an exemplary use of the method after a request sent by a user, and
  FIG. 4, an example in the case of a named entity "Pierre Alchantel".

FIG. 1 represents an exemplary system in which the method will execute different physical actions at the database level to optimize the quality of the database and consequently obtain a better management thereof. The system 1 comprises a processor 2 adapted to execute the various steps of the method according to the invention, an unstructured database 3 which can contain texts, a buffer memory 4 which will make it possible to store all the data for which matching is required and possibly a storage database 5 in the case where the canonic data replacing the basic data are not stored in the initial database. The result of this processing will therefore be physical interactions with the databases, notably in the case of replacement of a datum with another datum.

Figure 2:
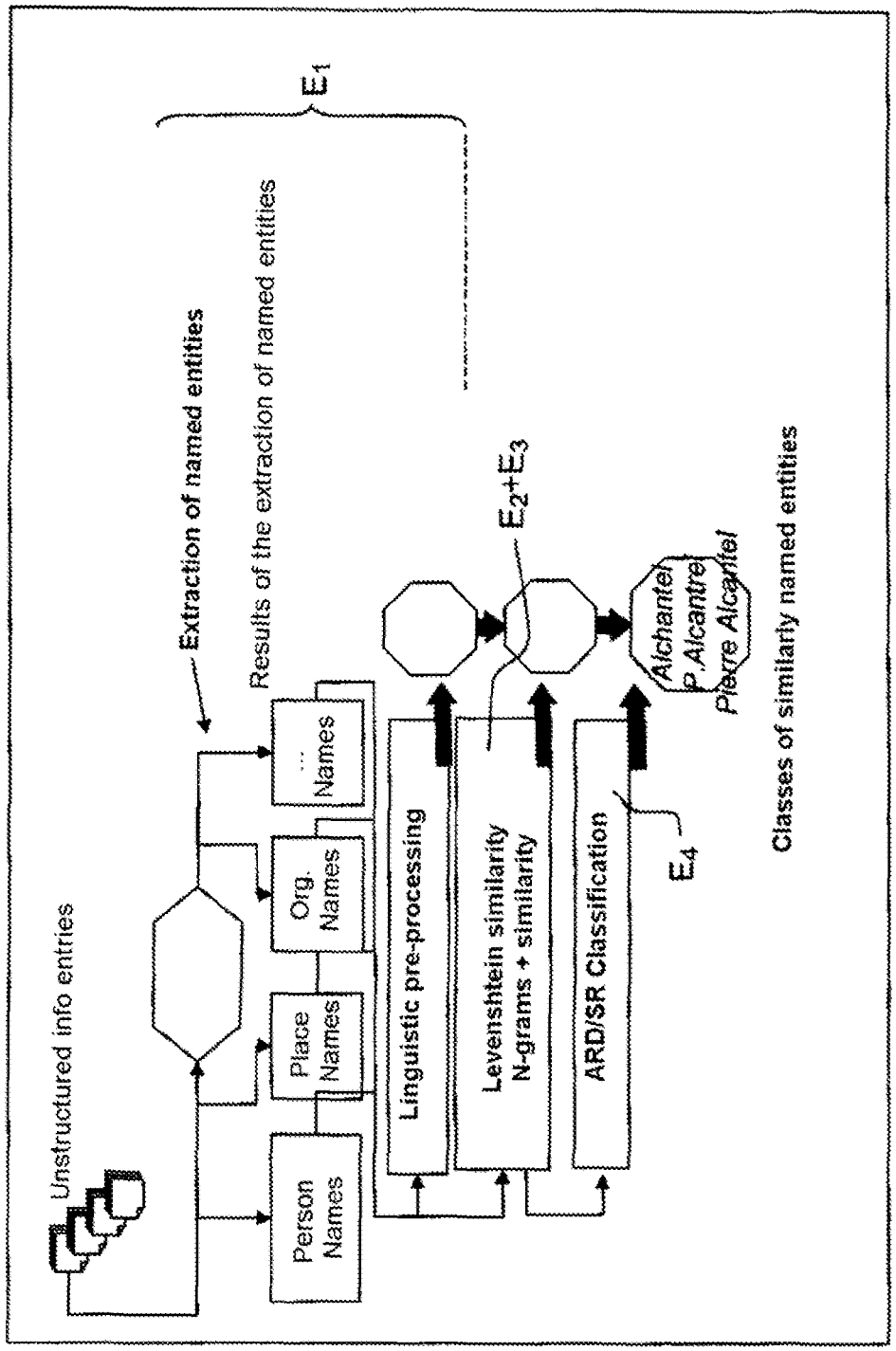

The steps implemented by the method are represented in FIGS. 1 and 2. The first step $E_1$ consists in extracting from the collection of unstructured data 3, using an information extraction mechanism known to those skilled in the art, a list of data consisting of a list of semantically-typed named entities $L_s$, such as names of persons, places, organizations. The latter can be stored temporarily in the buffer memory 4 which will be used to store the data during processing in the case where the processor's working memory is insufficient. This first step $E_1$ can consist of a step for pre-processing and applying, linguistic data transformation rules. These pre-processing operations are known to those skilled in the art and will not be explained. For example, in a named entity of Organization type, the forms Ltd will be restored to the form Limited, Corp to the form Corporation, in order to assist the matching of entities such as XXX Limited, XXX Ltd. These pre-processing rules are of two types: some are independent of the categories of entities in the database concerned (passage with poor typography, deletion of punctuation marks, etc.); others are dependent on the categories of entities in the database concerned. The transformation rules are simple and open-ended; they do not require any sophisticated linguistic knowledge.

The list of entities pre-processed in this way will be placed in the buffer memory 4, and the method will apply the matching method according to the invention to this list. For this, the method will execute similarity step $E_2$ by applying the Levenshtein distance method detailed hereinbelow to the data that are presented in the form of a list of N lines, N being the number of objects or entities to be matched. At the output of the step $E_2$, there is a matrix comprising A lines and A columns, the elements $E_i$ of this matrix or table corresponding to a similarity value between two objects.

The third step $E_3$ consists in applying the n-grams method to the outputs of $E_2$ then in measuring the similarity between the elements or named entities to be matched.

A fourth step $E_4$ will use a merging method, taking into account all the similarity matrices calculated previously. The relational analysis will, for example, be used to do this merging. The aim of the relational analysis is, notably, to determine, in the database being studied, classes of named entities, such that each class consists of all the written forms of one and the same entity. These classes are relative to the similarities defined by the Levenshtein distance method and the n-grams method. The C classifications, in which C is the number of different similarity measurements used, will give C partitions. The method once again uses the relational analysis to find the consensus partition between the C previous classifications, the one that will be the closest, from the C partitions found previously.

The method according to the invention will be explained in a more concrete manner through the following detailed example. The example will be given in the non-limiting context of use of the Levenshtein method and of the n-grams for the 2-grams and 3-grams.

Another function of the relational analysis is, notably, to consider m entities $E_i$ belonging to one and the same class Ci and find the representative entity. In the context of an automatic process, it is this representative entity that will be stored in a database, which means that the entities initially present in a database will be replaced by their canonic form which is the entity $E_i$ found after the consensus. In the context of a semi-automatic process, it is the user who will chose the representative canonic form. Thus, the initially unclassified data will be replaced by a single form, which will be considered to be the canonic form for all the entities.

The algorithm used by the method according to the invention and running on the processor consists of at least the following three parts:

Step 1

Use of a linguistic pre-processing

Step 2

Use and transformation of the Levenshtein distance to create a similarity. This transformation is fundamental, since the Levenshtein distance is not normed. In practice, if $D(E_1,E_2)$ is the Levenshtein distance between the two entities $E_1$ and $E_2$, and if $|E_1|$, respectively $|E_2|$, is used to denote the number of characters of $E_1$, respectively $E_2$, the only information that is available on $D(E_1,E_2)$ is: $0 \leq D(E_1,E_2) \leq \max(|E_1|,|E_2|)$. From this relationship, it is possible to define a similarity measurement $S_l(E_1,E_2)$ between the two entities, such that $0 \leq S_l(E_1,E_2) \leq 1$, by the relationship:

$$S_l(E_1, E_2) = 1 - \frac{D(E_1, E_2)}{\max(|E_1|, |E_2|)}.$$

Use of the n-grams (in particular the 2-grams and 3-grams) to create similarity $S_n(E_1,E_2)$ between entities. To define this similarity, there are extracted from the two entities $E_1$ and $E_2$, the sets $N_1$ of the n-grams of $E_1$ and the set $N_2$ of the n-grams of $E_2$, there are then defined the number of n-grams $|N_1|$ deduced from $E_1$ and the number of n-grams $|N_2|$ deduced from $E_2$. The similarity between $E_1$ and $E_2$ is then defined by:

$$S_n(E_1, E_2) = \frac{|N_1 \cap N_2|}{\min(|N_1|, |N_2|)}.$$

in which $|N_1 \cap N_2|$ is the number of n-grams common to the two sets $N_1$ and $N_2$.

Step 3

There are then constructed, by use of the theory of relational analysis, three classifications, for all the entities present in the database being studied, relative to the three similarities defined hereinabove (the similarity for the 2-grams, the similarity for the 3-grams and the similarity deduced from the Levenshtein distance). These three classifications will therefore give three partitions (three sets of entity classes) $P_i$ (i=1, 2, 3).

It will then be a matter of using the relational analysis to find the consensus partition $P_c$ between the above three partitions (the one that will be the closest of the three partitions).

To accomplish the relational analysis step to find the consensus partition between the previous three partitions, the regularized similarity will be used to weight the weights of each partition differently, in the calculation of the overall similarity deduced from the three partitions. To this end, the first step is to calculate the density $\delta_i$ of each partition $P_i$. This density is a measurement of the aggregation power of the partition concerned. It is defined by the relationship:

$$\delta_i = \frac{\sum_{k=1}^{K} n_{ik}^2}{nb\_entities^2}$$

in which $\kappa$ is the number of classes of the partition $P_i$, $n_{ik}$ is the number of named entities in the class k of the partition $P_i$ and nb_entities is the number of entities present in the base. If we use $$\Delta = \sum_{i=1}^{3} \delta_i,$$

then the weight $\Pi_i$ of the partition $P_i$ will be:

$$\Pi_i = 0.5 \times \left(1 - \frac{\delta_i}{\Delta}\right).$$

The greater the density of a partition, the less impact it will have in the calculation of the overall similarity.

Another method consists in calculating the similarity $S(E_i, E_j)$ for two named entities $E_i$ and $E_j$, as a combination of different similarities in the following manner:

$$S(E_i,E_j)=w_1 S_L(E_i,E_j)+w_2 S_n^2(E_i,E_j)+w_3 S_n^3(E_i,E_j)+ \ldots +w_k S_n^k(E_i,E_j)$$

in which:

$S_L(E_i,E_j)$ is the Levenshtein similarity and $S_n^2(E_i,E_j)$, $S_n^3(E_i,E_j)$, ..., $S_n^k(E_i,E_j)$ are the 2-grams, 3-grams, and so on similarities $w_1, w_2, w_3, \ldots, w_k$ are the weights applied to the different similarities The end result will be a single similarity matrix to which the relational analysis will be applied to obtain a base partition. The relational analysis in this regard will be applied only once. Unlike the proposed method in which it is applied several times (as many times as there are similarities used and one last time for the merging of the different partitions obtained).

The "consensus partition" is the partition that will be the closest of the partitions obtained in the step 3. For example, if the Levenshtein similarity+the 2-grams similarity+the 3-grams similarity are used, then, after the first use of the relational analysis on each of the similarity matrices, there will be three partitions. If we assume that, for the two entities named $E_i$ and $E_j$, the following results are obtained:

$E_i$ and $E_j$ are in the same class of the partition obtained by the Levenshtein similarity, $E_i$ and $E_j$ are in the same class of the partition obtained by the 2-grams similarity, but $E_i$ and $E_j$ are not in the same class of the partition obtained by the 3-grams similarity, Then, these two named entities will be in the same class of the final "consensus partition" because they were together for ⅔ of the partitions (this brings in the vote theory that is the basis of the relational analysis). This also is in line with the meaning of "closest classification" which is quite simply the compromise classification between the different classifications obtained in the sense that we have just explained.

The overall similarity at this stage is the sum of the three similarities (weighted thanks to the similarity regularised by weights). The term "overall" simply means that we have changed from individual similarities to a "combination similarity" of the different similarities.

The regularised similarity is a method of calculating similarity between the objects of a database, capable of automatically giving more or less significant weights to certain variables measured on the objects of the base.

The following explains how to use the relational analysis to obtain this consensus partition:

$$s_{ij}^k = \begin{cases} 1 & \text{if } (E_i, E_j) \text{ are in the same class of the partition } k \\ 0 & \text{otherwise} \end{cases}$$

If κ is the number of partitions obtained in the first stage (classification of each of the similarities used individually), the overall similarity $s_{ij}$, between two named entities $E_i$ and $E_j$, will then be:

$$s_{ij} = \sum_{k=1}^{\kappa} w_k s_{ij}^k$$

It is to this similarity that the relational analysis will be applied for the second time to find the consensus partition.

If ρ is the number of classes of a given partition $P_j$ and nb_entities the total number of named entities in the base, then the relationship between $n_{jk}$ and nb_entities is:

$$\text{nb\_entities} = \sum_{k=1}^{p} n_{ik}$$

Figure 3:
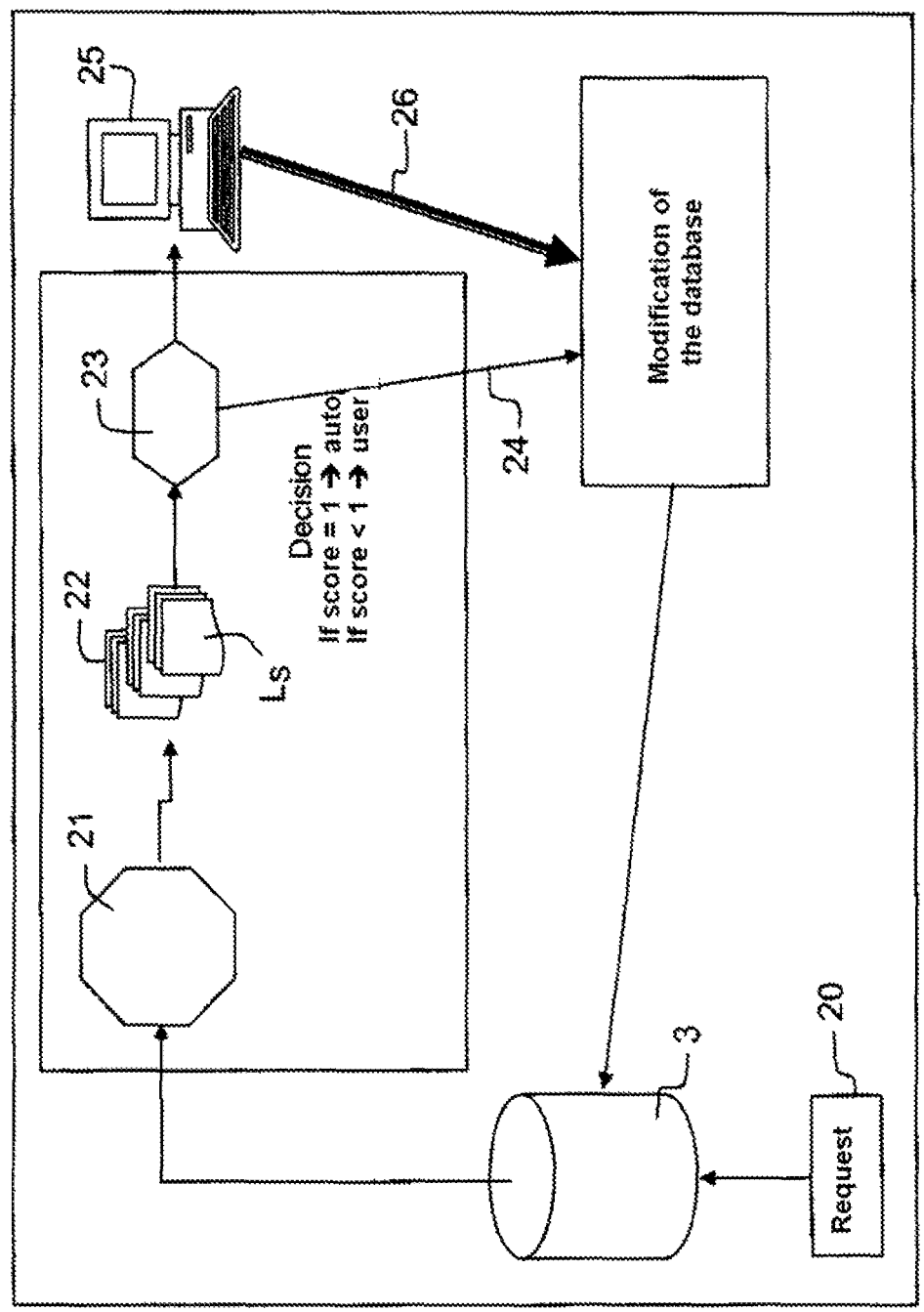

FIG. 3 diagrammatically represents an exemplary use of the system and of the method according to the invention, by a user represented in the figure by a request 20 which he sends to a database 3 containing, for example, the names of persons, places or organizations, or a set of these entities. The user will, for example, send a request to "search" on a name of a person, a place, an address, etc., and this request sent to the database to be managed will apply the method according to the invention. The processor triggers a step 21 making it possible to search for the close forms or matching method such as that detailed in FIGS. 1 and 2. All of the classes of the close forms detected 22 will be transmitted to a decision-making device 23. This decision-making can be automatic, 24, if, in the classes found, the similarity of the entities belonging to the class is 1. Conversely, if, in the classes found, the similarity is less than 1, the decision-making involves the user, through a human-machine interface 25, and it is the user 26 who will control the modification in the database.

Figure 4:
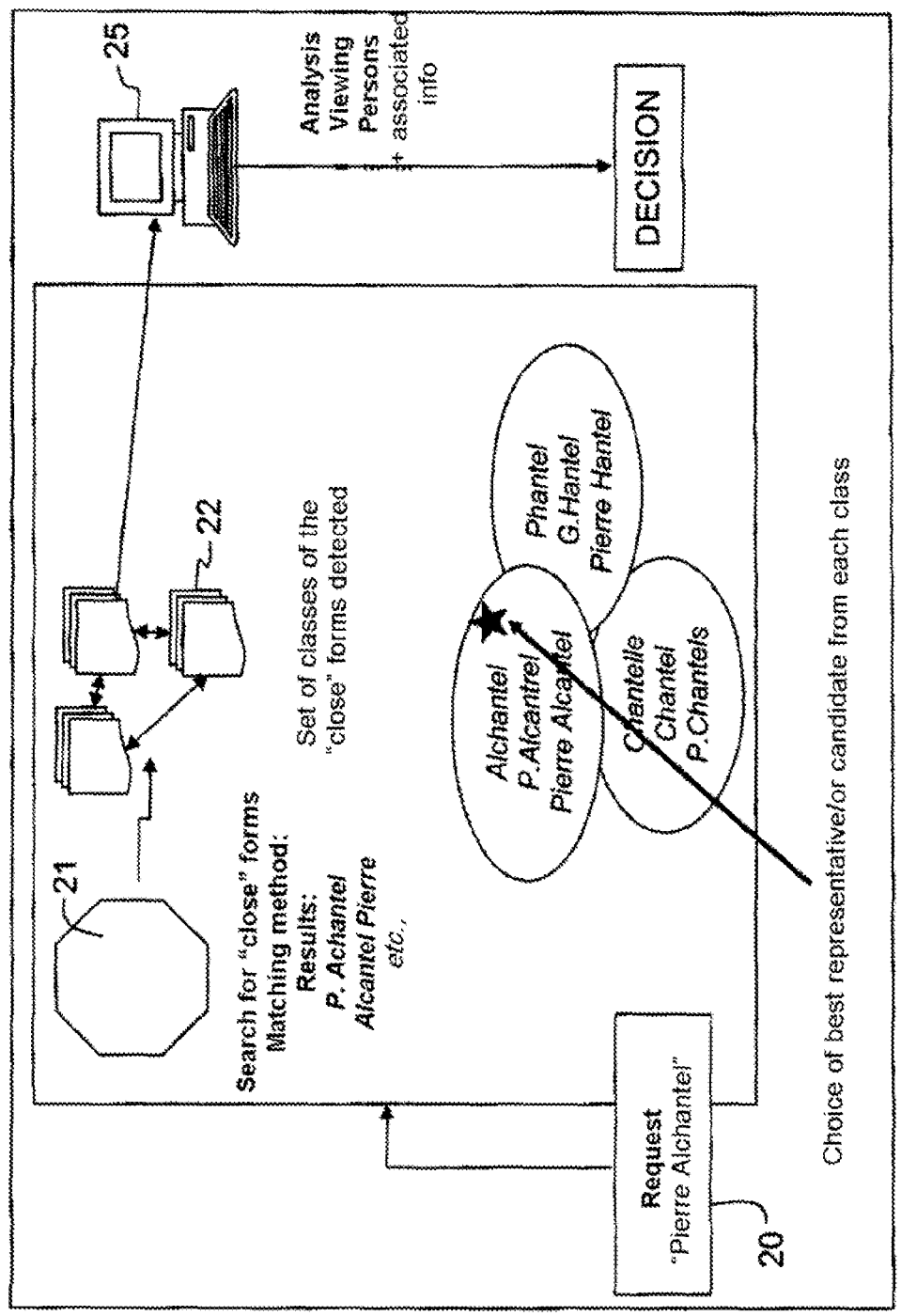

FIG. 4 represents the implementation of the system of FIG. 3 in the precise case of an entity named "Pierre Alchantel". On request from an operator, the method according to the invention will perform a search for the proper forms by applying the method according to the invention. It will obtain all the classes of the "close detected" forms. The analysis and visualization of the persons and associated information will be displayed on a screen 25 in order for the operator to be able to take a decision.

In the context of an application to the management of identification, in companies, of individuals, the method according to the invention makes it possible to apply "cleaning" processes to the databases.

For applications managing the identification of persons within a company database, the method will make it possible to identify a set of records that refer to a company using a single representative.

Also, the method according to the invention makes it possible at a given instant to perform "cleaning" operations on the databases (deleting false duplicates) which in turn will make it possible to merge the information associated with the false duplicates.

The method also offers automatic matching processes (not involving the database or knowledge base administrator).

The method according to the invention will be applied to numerous fields such as the matching of proper names, such as names of organizations, names of places, the matching of co-referent named entities, the interrogation of databases, the management of data and databases, the management of knowledge and knowledge bases, the management of identification, search for similarities between named entities, between proper names, the merging of data, the automatic processing of natural language.

The invention claimed is:

1. A method making it possible to manage named entities that are presented in different graphical or syntactic forms and refer to the same entity contained in a database (3), wherein it comprises at least the following steps:

applying a Levenshtein method to said entities $E_i$ in the database in order to create a similarity between said entities, defining the measurement of similarity between two entities in the following manner $$S_l(E_i, E_j) = 1 - \frac{D(E_i, E_j)}{\max(|E_i|, |E_j|)}$$

with $S_l$ being the measurement of similarity between the two entities ($E_i, E_j$) in the database, D being the Levenshtein distance between the two entities, $|E_i|$ respectively $|E_j|$ being the number of characters of $E_i$, respectively $E_j$, using the n-grams method to create a similarity $S_n(E_i, E_j)$ between the A entities constituting the database, by extracting from the two entities $E_i$ and $E_j$ the sets $N_i$ of the n-grams of $E_i$ and the set $N_j$ of the n-grams of $E_j$, then defining the number of n-grams $|N_i|$ deduced from $E_i$ and the number of n-grams $|N_j|$ deduced from $E_j$, the similarity between $E_1$ and $E_j$ is then defined by:

$$S_n(E_i, E_j) = \frac{|N_i \cap N_j|}{\min(|N_i|, |N_j|)};$$

using a method of merging the data on said entities in the database in order to construct at least 2 classifications, respectively relating to the n-grams similarity with n greater than or equal to 2, said classifications corresponding to sets of entity partitions $P_i$, wherein the partitions Pi correspond with the classifications of all the entities in the database;

finding the consensus partition $P_c$ between the M partitions found, using the canonic form entity $E_c$ to view the result or else modify the entities present in the database through the canonic form entity.

2. The method according to claim 1, wherein the merging method is the relational analysis method.

3. The method according to claim 2, wherein, in the relational analysis step, the method for accomplishing the relational analysis step to find the consensus partition between the determined partitions will use the regularized similarity to weight the weight of each partition differently, in the calculation of the overall similarity deduced from the three partitions by executing the following steps the first step is to calculate the density $\delta_i$ of each partition $P_i$, this density is a measurement of the aggregation power of the partition concerned and is defined by the relation:

$$\delta_i = \frac{\sum_{k=1}^{K} n_{ik}^2}{nb\_entities^2}$$

in which $\kappa$ is the number of classes in the partition $P_i$, $n_{ik}$ the number of entities in the partition k and nb_entities is the number of entities present in the database, by denoting $$\Delta = \sum_{i=1}^{3} \delta_i,$$

then the weight $\Pi_i$ of the partition $P_i$ will be:

$$\Pi_i = 0.5 \times \left(1 - \frac{\delta_i}{\Delta}\right).$$

4. The method according to claim 3 wherein it comprises a step for sending a request from a user to find the canonic entities in a database and replace said entities with the canonic entity found.

5. The method according to claim 1 wherein it comprises a step for sending a request from a user to find the canonic entities in a database and replace said entities with the canonic entity found.

6. A system making it possible to manage named entities that are presented in different graphical or syntactic forms and refer to the same entity, contained in a database in which the system is capable of executing different physical actions at the database level to optimize the quality of the database and consequently obtain a better management thereof, wherein the system comprises at least the following elements:

a processor and a memory for storing instructions which cause the processor to execute the following steps:

apply a Levenshtein method to entities $E_i$ in the database in order to create a similarity between said entities, defining the measurement of similarity between two entities in the following manner $$S_l(Ei, E_j) = 1 - \frac{D(E_i, E_j)}{\max(|E_i|, |E_j|)}$$

with $S_l$ being the measurement of similarity between the two entities ($E_i$, $E_j$) in the database, D being the Levenshtein distance between the two entities, $E_i$ respectively $E_j$ being the number of characters of $E_i$, respectively $E_j$, use the n-grams method to create a similarity $S_n$ ($E_i$,$E_j$) between the A entities constituting the database, by extracting from the two entities $E_i$ and $E_j$ the sets $N_i$ of the n-grams of $E_i$ and the set $N_j$ of the n-grams of $E_j$, then defining the number of n-grams $|N_i|$ deduced from $E_i$ and the number of n-grams $|N_j|$ deduced from $E_j$, the similarity between $E_1$ and $E_j$ is then defined by:

$$S_n(E_i, E_j) = \frac{|N_i \cap N_j|}{\min(|N_i|, |N_j|)},$$

use a method of merging the data on said entities in the database in order to construct at least 2 classifications, respectively relating to the n-grams similarity with n greater than or equal to 2, said classifications corresponding to sets of entity partitions $P_i$, wherein the partitions Pi correspond with the classifications of all the entities in the database, and find the consensus partition $P_c$ between the M partitions found, using the canonic form entity $E_c$ to view the result or else modify the entities present in the database through the canonic form entity, an unstructured database (3) which can contain texts, a buffer memory (4) making it possible to store all the data for which the matching is required.

7. The system according to claim 6, wherein the system comprises a device (23) for taking decisions following a request (20) formulated by a user.

8. The system according to claim 6, wherein the system comprises a human-machine interface (25) making it possible to display a classification result and the intervention of an operator to modify the initial database by replacing the entities present in the database with the canonic form entity.

* * * * *